(12) United States Patent
Nagata et al.

(10) Patent No.: US 9,073,511 B2
(45) Date of Patent: Jul. 7, 2015

(54) SEATBELT DEVICE

(71) Applicant: KABUSHIKI KAISHA TOKAI-RIKA-DENKI-SEISAKUSHO, Aichi-ken (JP)

(72) Inventors: Yuya Nagata, Aichi-ken (JP);
Yoshimichi Kaneko, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 14/294,682

(22) Filed: Jun. 3, 2014

(65) Prior Publication Data

US 2014/0361114 A1 Dec. 11, 2014

(30) Foreign Application Priority Data

Jun. 6, 2013 (JP) ................................. 2013-120242

(51) Int. Cl.
*B60R 22/24* (2006.01)
*B60R 22/34* (2006.01)

(52) U.S. Cl.
CPC ......... *B60R 22/24* (2013.01); *B60R 2022/3402* (2013.01)

(58) Field of Classification Search
CPC ....................... B60R 22/24; B60R 2022/3402
See application file for complete search history.

(56) References Cited

U.S. PATENT DOCUMENTS

| 2,916,115 | A | * | 12/1959 | Niel et al. | 403/14 |
| 5,129,680 | A | * | 7/1992 | Mori | 280/806 |
| 5,941,567 | A | * | 8/1999 | Wickenheiser | 280/808 |
| 2007/0114317 | A1 | * | 5/2007 | Fauser | 242/379.1 |
| 2013/0320126 | A1 | * | 12/2013 | Michel | 242/382 |
| 2014/0117138 | A1 | * | 5/2014 | Egawa et al. | 242/384.2 |
| 2014/0145022 | A1 | * | 5/2014 | Tombe et al. | 242/390.8 |

FOREIGN PATENT DOCUMENTS

JP 2011255730 12/2011

* cited by examiner

*Primary Examiner* — Drew Brown
(74) *Attorney, Agent, or Firm* — Roberts Mlotkowski Safran & Cole P.C.

(57) ABSTRACT

In a webbing take-up device, a housing portion configuring a recessed shape opening in a direction orthogonal to a fastening direction of a screw is formed to a body. A head portion of the screw is housed inside the housing portion, and the screw is inserted through an insertion portion in one side wall of the housing portion and fastened to the frame. A tool hole is formed in another side wall of the housing portion. A tool can accordingly be inserted through the tool hole to fasten the screw to the frame. The other side wall is formed with a fixing hole that fixes a spring cover, the fixing hole overlapping with the head portion as viewed along the screw fastening direction. A placement space of the screw and the fixing hole in the body as viewed along the screw fastening direction can accordingly be made small.

9 Claims, 8 Drawing Sheets

SEATBELT DEVICE

CROSS-REFERENCE TO RELATED APPLICATION

This application claims priority under 35 USC 119 from Japanese Patent Application No. 2013-120242 filed Jun. 6, 2013, the disclosure of which is incorporated by reference herein.

BACKGROUND

1. Field of the Invention

The present invention relates to a seatbelt device.

2. Related Art

A vehicle seatbelt device includes a webbing take-up device (device configuration member) that takes up webbing. In such webbing take-up devices, for example, units configured with respective functions are assembled to a frame (base member).

For example, in a webbing take-up device disclosed in Japanese Patent Application Laid-Open (JP-A) No. 2011-255730, a case (first member) of a drive mechanism is fixed to a frame by a fastening member such as a screw, and a cover (second member) of a biasing mechanism is fixed to the case. A head portion of the fastening member is disposed in the case, and a fixing hole for fixing the cover is also formed to the case. Namely, there is a need to secure enough space in the case for both the head portion of the fastening member and the fixing hole.

However the fastening member and the fixing hole are disposed in the vicinity of one another, due for example to space limitations, and, for example, it is desirable to reduce the space occupied by the fastening member and the fixing hole in order to meet demands, such as for more compact configuration.

SUMMARY

In consideration of the above circumstances, the present invention is to provide a seatbelt device capable of making small of placement space for a fastening member and a fixing hole in a first member.

A seatbelt device of a first aspect includes: a first member that is fixed by a fastening member to a base member used in a device configuration member configuring a portion of the seatbelt device; a second member that is fixed to the first member on opposite side of the first member to the base member; a housing portion that is formed at the first member, that configures a recessed shape opening in a direction orthogonal to a fastening direction of the fastening member, and that houses a head portion of the fastening member; one side wall that configures a side wall of the housing portion on the base member side, and that includes an insertion portion through which the fastening member is inserted; and another side wall that configures a side wall of the housing portion on the second member side, that includes a tool hole for inserting a tool to fasten the fastening member to the base member, and that includes a fixing hole for fixing the second member, the fixing hole being disposed at a position overlapping with the head portion of the fastening member as viewed along the fastening direction of the fastening member.

In the seatbelt device of the first aspect, the device configuration member configuring a portion of the seatbelt device is configured including the base member, the first member, and the second member. The first member is fixed to the base member by the fastening member, and the second member is fixed to the first member on the opposite side of the first member to the base member.

The first member is formed with the housing portion, with the housing portion configuring a recessed shape opening in a direction orthogonal to the fastening direction of the fastening member. Moreover, the side wall on the base member side of the housing portion configures the one side wall, and the side wall on the second member side of the housing portion configures the other side wall. Namely, the other side wall, the housing portion, and the one side wall are disposed along the fastening member fastening direction.

In the housed state of the head portion of the fastening member inside the housing portion, the fastening member is inserted through the insertion portion of the one side wall and fastened to the base member. As a result, the one side wall of the first member is fixed to the base member by the fastening member in a disposed state of the head portion of the fastening member inside the first member.

The other side wall of the first member is formed with the tool hole. A leading end portion of the tool can accordingly be inserted into the tool hole to fasten the fastening member to the base member with the tool, even with the head portion of the fastening member housed inside the housing portion.

The other side wall of the first member is formed with the fixing hole for fixing the second member. The fixing hole is disposed at a position overlapping with the head portion of the fastening member as viewed along the fastening direction of the fastening member. Namely, the fixing hole is formed in the other side wall, at a position different to the position of the housing portion in the fastening member fastening direction, and the second member is fixed to the fixing hole. Accordingly, the fixing hole can be disposed at a position overlapping with the head portion of the fastening member as viewed along the fastening member fastening direction, while suppressing the fixing hole and the head portion of the fastening member from interfering with one another. The placement space of the fastening member and the fixing hole in the first member as viewed along the fastening member fastening direction can accordingly be reduced.

A seatbelt device of a second aspect is the seatbelt device of the first aspect, wherein the tool hole and the fixing hole are in communication with each other.

In the seatbelt device of the second aspect, the tool hole and the fixing hole are in communication with each other, thereby enabling the placement space of the fastening member and the fixing hole in the first member as viewed along the fastening member fastening direction to be further made small.

A seatbelt device of a third aspect is the seatbelt device of the first aspect, wherein the tool hole is also serves as the fixing hole.

In the seatbelt device of the third aspect, a hole is formed in the other side wall at a single location, corresponding to the fastening member, and this hole can be used as both the tool hole and the fixing hole. This enables a common tool hole and fixing hole, thereby enabling the placement space of the fastening member and the fixing hole in the first member as viewed along the fastening member fastening direction to be still further made small.

A seatbelt device of a fourth aspect is the seatbelt device of any one of the first aspect to the third aspect, wherein: a fixing portion is integrally formed at the second member, and the second member is fixed to the first member by the fixing portion being inserted into the fixing hole and fitting with the fixing hole.

In the seatbelt device of the fourth aspect, the fixing portion integrally formed to the second member fits together with the fixing hole of the first member such that the second member is fixed to the first member. The second member can accordingly be fixed to the first member with a simple configuration, while suppressing an increase in cost.

A seatbelt device of a fifth aspect is the seatbelt device of any one of the first aspect to the fourth aspect, wherein: the insertion portion is formed in a groove shape opening toward an opening side of the housing portion as viewed along the fastening direction of the fastening member; and a claw portion capable of engaging with the fastening member is formed at an inner peripheral portion of the insertion portion.

In the seatbelt device of the fifth aspect, the insertion portion is formed in a groove shape opening toward the housing portion opening side as viewed along the fastening direction of the fastening member. The fastening member can accordingly be disposed at a specific fastening position by inserting the head portion of the fastening member into the housing portion while inserting the fastening member into the insertion portion.

Moreover, the claw portion is formed to the inner peripheral portion of the insertion portion, with the claw portion configured so as to be capable of engaging with the fastening member. Movement of the fastening member toward the housing portion opening side is accordingly suppressed, enabling the fastening member to be temporarily retained at the fastening position. The first member can accordingly be disposed at an assembly position to the base member with the fastening member in a temporarily retained state in the fastening position. The ease of assembly during assembly of the first member to the base member can accordingly be improved.

A seatbelt device of a sixth aspect is the seatbelt device of any one of the first aspect to the fifth aspect, wherein: the device configuration member is a webbing take-up device provided with a webbing that restrains a body of an occupant; and the base member is a frame that rotatably supports a spool for taking up the webbing.

In the seatbelt device of the sixth aspect, the device configuration member is a webbing take-up device. A space saving can accordingly be achieved in a fixing structure of the webbing take-up device, for example when plural units configured with respective functions are fixed overlapping one another.

The seatbelt device of the first aspect enables a reduction (making small) in the placement space of the fastening member and the fixing hole in the first member.

The seatbelt device of the second aspect enables a further reduction in the placement space of the fastening member and the fixing hole in the first member.

The seatbelt device of the third aspect enables yet a further reduction in the placement space of the fastening member and the fixing hole in the first member.

The seatbelt device of the fourth aspect enables the second member to be fixed to the first member with a simple configuration, while suppressing an increase in cost.

The seatbelt device of the fifth aspect enables an improvement in the ease of assembly during assembly of the first member to the base member.

The seatbelt device of the sixth aspect enables a space saving in a fixing structure of the webbing take-up device when plural units configured with respective functions are fixed overlapping one another.

BRIEF DESCRIPTION OF THE DRAWINGS

Embodiments of the invention will be described in detail with reference to the following figures, wherein.

DETAILED DESCRIPTION

Explanation follows regarding an overall seatbelt device 10 according to an exemplary embodiment, with reference to the drawings. Explanation then follows regarding a webbing take-up device 12 serving as a device configuration member configuring a portion of the seatbelt device 10. Explanation is then given regarding a fixing structure 80 that is applied to the webbing take-up device 12. The following explains the seatbelt device 10 applied to a vehicle seat S installed on the right hand side of a vehicle. Note that a seatbelt device applied to a vehicle seat installed on the left hand side of the vehicle is configured to be left-right symmetrical to the seatbelt device 10 applied to the vehicle seat S on the right hand side of the vehicle.

Figure 7:
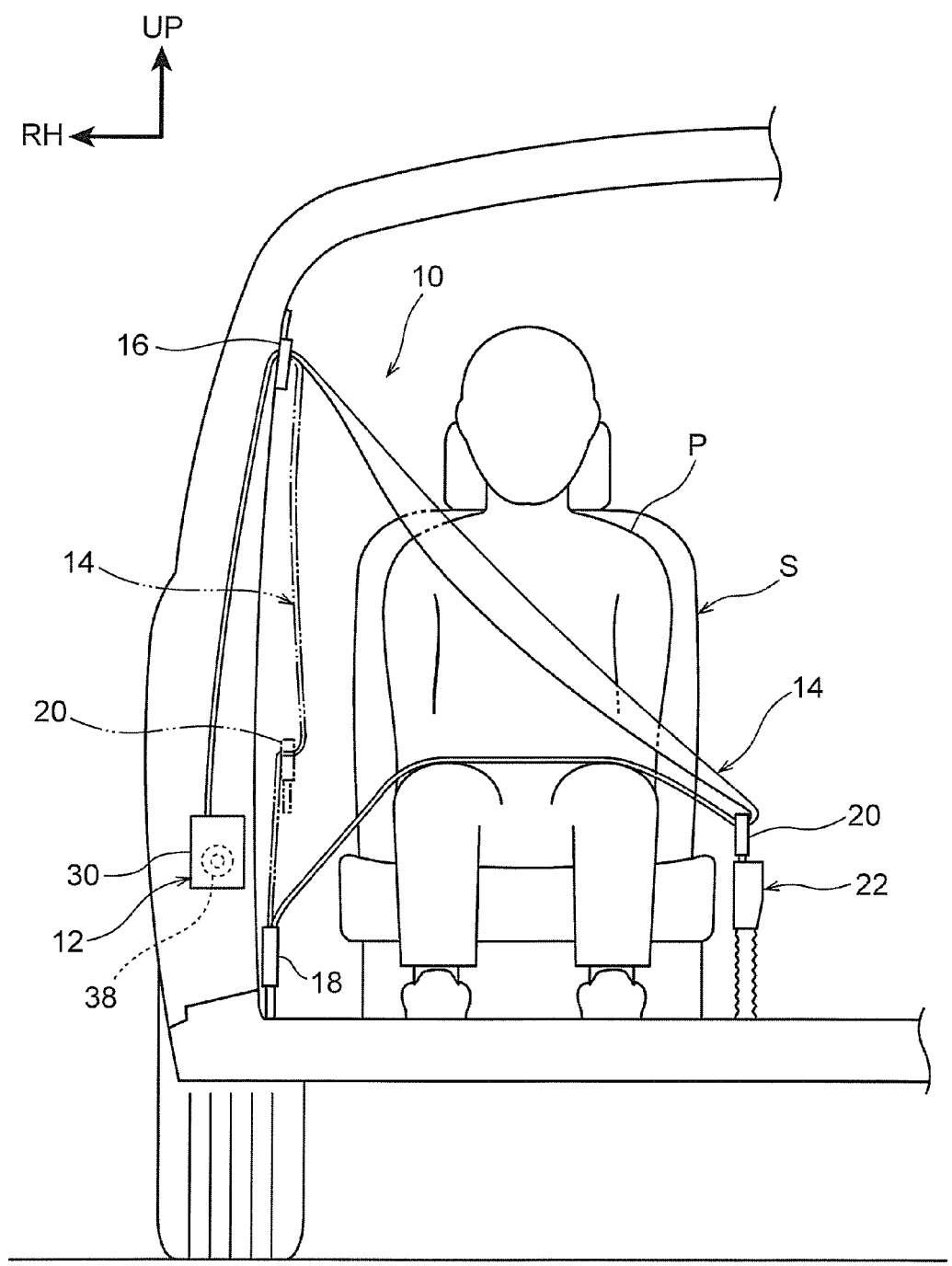
FIG. 7 is a front view showing an overall seatbelt device according to the present exemplary embodiment, as viewed from the vehicle front side.

As shown in FIG. 7, the seatbelt device 10 includes the webbing take-up device 12. In FIG. 7, the arrow RH indicates the vehicle right hand side (one side in a vehicle width direction), and the arrow UP indicates upwards. The webbing take-up device 12 is fixed to the vehicle body at, for example, a vehicle central pillar (not shown in the drawings), and is disposed to the side of the vehicle seat S. Substantially elongated strap shaped webbing 14 extends out from the webbing take-up device 12 toward the vehicle upper side, and is inserted through a through anchor 16 provided in the vehicle. The webbing 14 is folded back by the through anchor 16 so as to extend from the through anchor 16 toward the vehicle lower side, with a leading end portion of the webbing 14 is fixed to an anchor 18 of the vehicle.

The webbing 14 is provided with a tongue plate 20 that is movable in the webbing 14 length direction. The tongue plate 20 engages with a buckle device 22 that is coupled to the vehicle body on the left side of the vehicle seat S, thereby mounting (applying) the webbing 14 over a seated occupant P, such that the body of the seated occupant P is restrained by the webbing 14.

Webbing Take-Up Device 12

Figure 6:
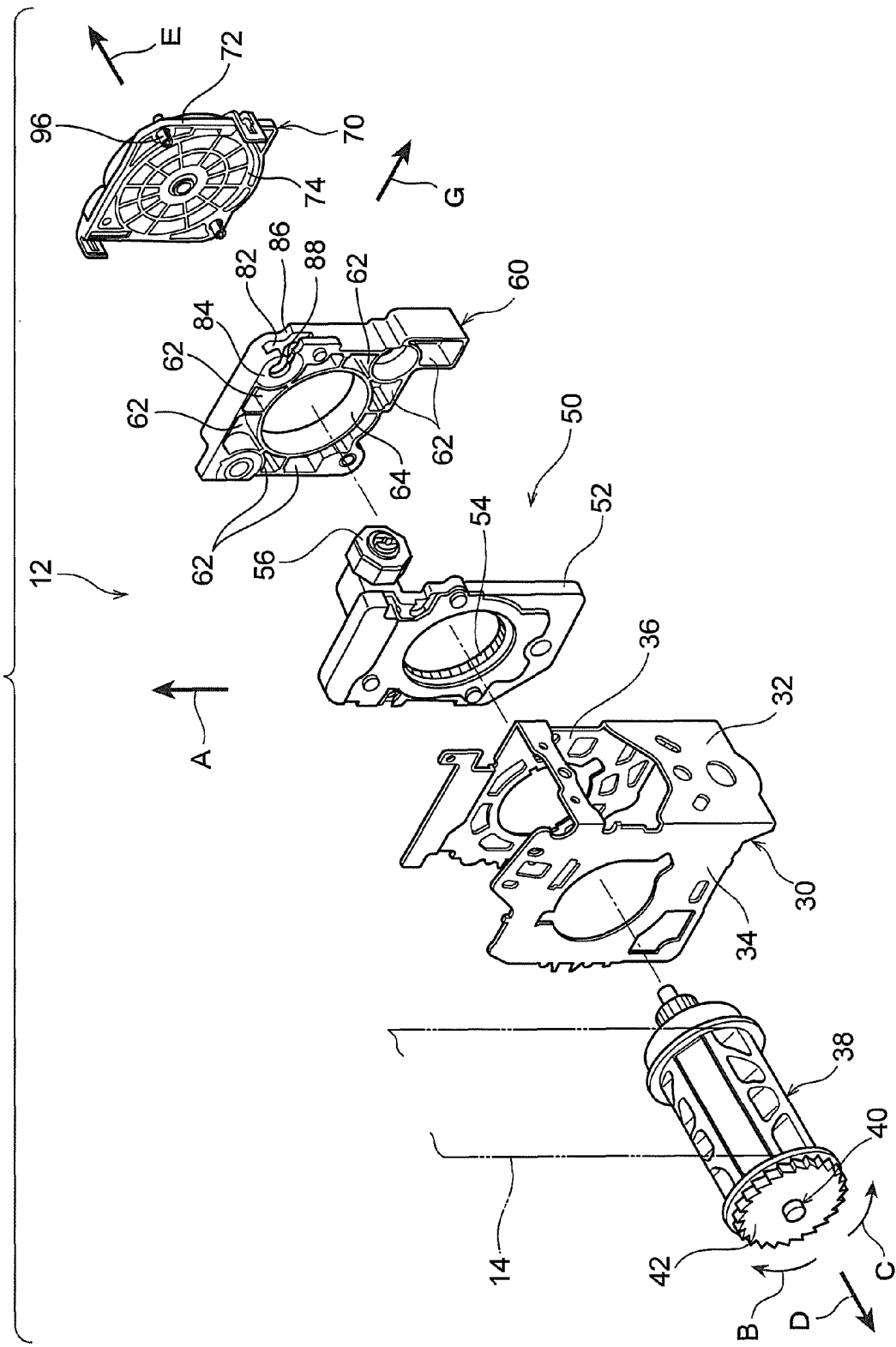
FIG. 6 is an exploded perspective view showing an overall webbing take-up device configuring a portion of a seatbelt device according to the present exemplary embodiment.

As shown in FIG. 6, the webbing take-up device 12 is configured including a frame 30, serving as a base member, and a substantially circular cylinder shaped spool 38 disposed inside the frame 30. The webbing take-up device 12 further includes a switching mechanism 50 disposed at the outside of the frame 30, a body 60, serving as a first member, and a biasing mechanism 70. Explanation follows regarding the respective configurations thereof.

The frame 30 is provided with a plate shaped back plate 32 that is fixed to the vehicle body. Leg plates 34 and 36 extend out at substantially right angles from both width direction ends of the back plate 32, such that the frame 30 is formed in a substantially recessed shape as seen in plan view from the upper side (the arrow A direction side in FIG. 6).

The spool 38 is disposed between the leg plate 34 and the leg plate 36 with the axial direction of the spool 38 being along a facing direction of the leg plate 34 and the leg plate 36. A torsion shaft 40, configuring a force remitter mechanism, is coaxially inserted into the spool 38 at an axial center portion. A coupling portion (not shown in the drawings) is formed at a length direction intermediate portion of the torsion shaft 40, with the torsion shaft 40 coupled to the spool 38 so as to be capable of rotating integrally with the spool 38 at the coupling portion. One length direction end portion of the torsion shaft 40 (the leg plate 34 side end portion of the torsion shaft 40) is indirectly rotatably supported at the frame 30, and the length direction other end portion (the leg plate 36 side end portion) of the torsion shaft 40 is rotatably supported at the frame 30 via the biasing mechanism 70, described later.

One length direction end portion (base end portion) of the webbing 14 is coupled and fixed to the spool 38. The spool 38 is rotated in a take-up direction (the arrow B direction in FIG. 6) to take up the webbing 14 from the base end side of the webbing onto an outer peripheral portion of the spool 38 in a layered shape. Pulling the length direction other end portion (leading end portion) of the webbing 14 rotates the spool 38 in a pull-out direction (the arrow C direction in FIG. 6), pulling the webbing 14 out from the spool 38.

A first twisting deformation portion, not shown in the drawings, is formed between the length direction one end portion and the coupling portion of the torsion shaft 40 described above. A second twisting deformation portion, not shown in the drawings, is formed between the length direction other end portion and the coupling portion of the torsion shaft 40.

The length direction one end portion of the torsion shaft 40 is integrally joined to a lock base 42 configuring a lock mechanism. The lock base 42 is formed in a substantially circular plate shape, disposed coaxially with the torsion shaft 40. Configuration is made such that rotation of the lock base 42 in the pull-out direction is restricted in the event of a vehicle emergency (sudden deceleration of the vehicle, or sudden rotation of the spool 38 in the pull-out direction). Accordingly, in the event of a vehicle emergency, the first twisting deformation portion undergoes twisting deformation, thereby permitting rotation of the spool 38 in the pull-out direction, such that kinetic energy of the seated occupant, pulling on the webbing 14, is absorbed by the first twisting deformation portion.

The switching mechanism 50 is disposed outside the leg plate 36 (on the arrow E direction side in FIG. 6) of the frame 30. Depending on the physical frame of the seated occupant, the switching mechanism 50 either switches, or does not switch, to allow the second twisting deformation portion of the torsion shaft 40 to undergo twisting deformation. More specifically, the switching mechanism 50 includes a substantially box shaped case 52, the case 52 fixed to the leg plate 36. An annular plate shaped lock ring 54 is rotatably supported inside the case 52, with a pawl (not shown in the drawings) provided in an engaged state with the lock ring 54. Rotation of the lock ring 54 in the pull-out direction is restricted in the engaged state of the pawl and the lock ring 54. A gas generator 56 is mounted in the case 52, with the gas generator 56 electrically connected to a vehicle controller (not shown in the drawings). The controller is moreover electrically connected to a physical frame sensor (not shown in the drawings) and a collision detection sensor (not shown in the drawings).

In the event of a vehicle emergency, the first twisting deformation portion of the torsion shaft 40 undergoes twisting deformation, such that the length direction other end portion of the torsion shaft 40 couples with the lock ring 54 via a coupling mechanism, not shown in the drawings. In this state, rotation of the lock ring 54 in the pull-out direction is restricted by the pawl, thereby restricting rotation of the length direction other end portion of the torsion shaft 40 in the pull-out direction. The second twisting deformation portion of the torsion shaft torsion shaft 40 thereby undergoes twisting deformation, such that the kinetic energy of the occupant pulling on the webbing 14 is absorbed by the first twisting deformation portion and the second twisting deformation portion.

Configuration is made such that when the physical frame of the occupant detected by the physical frame sensor is below a reference value, the controller controls to actuate the gas generator 56, releasing the engaged state between the pawl and the lock ring 54. Accordingly, rotation of the lock ring 54 in the pull-out direction is permitted in such a case, such that the second twisting deformation portion does not undergo twisting deformation.

The body 60 is configured from a resin material, and is disposed on the opposite side of the switching mechanism 50 to the frame 30 (on the arrow E side in FIG. 6). The body 60 is formed in a substantially rectangular plate shape, disposed with thickness direction in the spool 38 axial direction. The body 60 is fixed to the leg plate 36 of the frame 30 with the case 52 of the switching mechanism 50, in an interposed state between the body 60 and the frame 30. The body 60 is moreover formed with plural recessed portions 62 that are open toward the frame 30 side, and that suppress sink marks, for example, during molding of the body 60. A circular shaped insertion hole 64 is formed at a substantially central portion of the body 60, and the length direction other end portion of the torsion shaft 40 is inserted through the insertion hole 64.

The biasing mechanism 70 is disposed on the opposite side of the body 60 to the frame 30 (on the arrow E side in FIG. 6). The biasing mechanism 70 includes a spring cover 72 serving as a second member. The spring cover 72 is formed substantially in a box shape open toward the frame 30 side, and is fixed to the body 60. A flat spiral spring (a power spring) (not shown in the drawings) is provided inside the spring cover 72, and an opening portion of the spring cover 72 is closed off by a spring sheet 74. The spring sheet 74 accordingly covers the flat spiral spring. A coil direction (wind direction) outside end of the flat spiral spring is anchored to the spring cover 72. The coil direction (wind direction) inside end of the flat spiral spring is anchored to the length direction other end portion of the torsion shaft 40. The flat spiral spring biases the torsion shaft 40 (spool 38) in the take-up direction.

Figure 2:
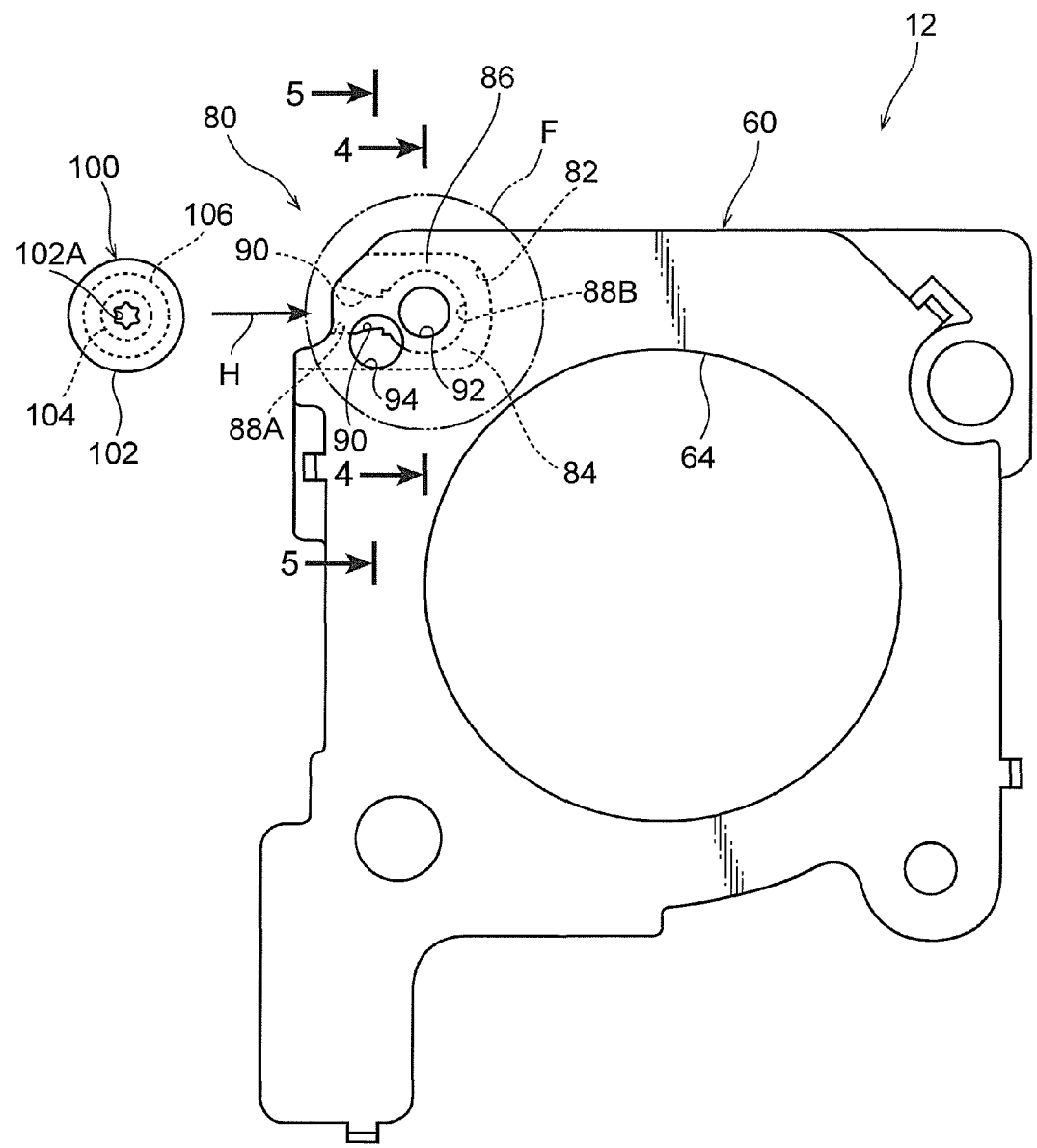
FIG. 2 is a side view showing the whole of the body shown in FIG. 1, as viewed from the spring cover side.

Explanation now follows regarding the fixing structure 80 of the body 60 and the spring cover 72, this being a main (relevant) portion of the present invention. As shown in FIG. 2, the fixing structure 80 is applied to an outer peripheral portion (portion F in FIG. 2) of the body 60.

Figure 1:
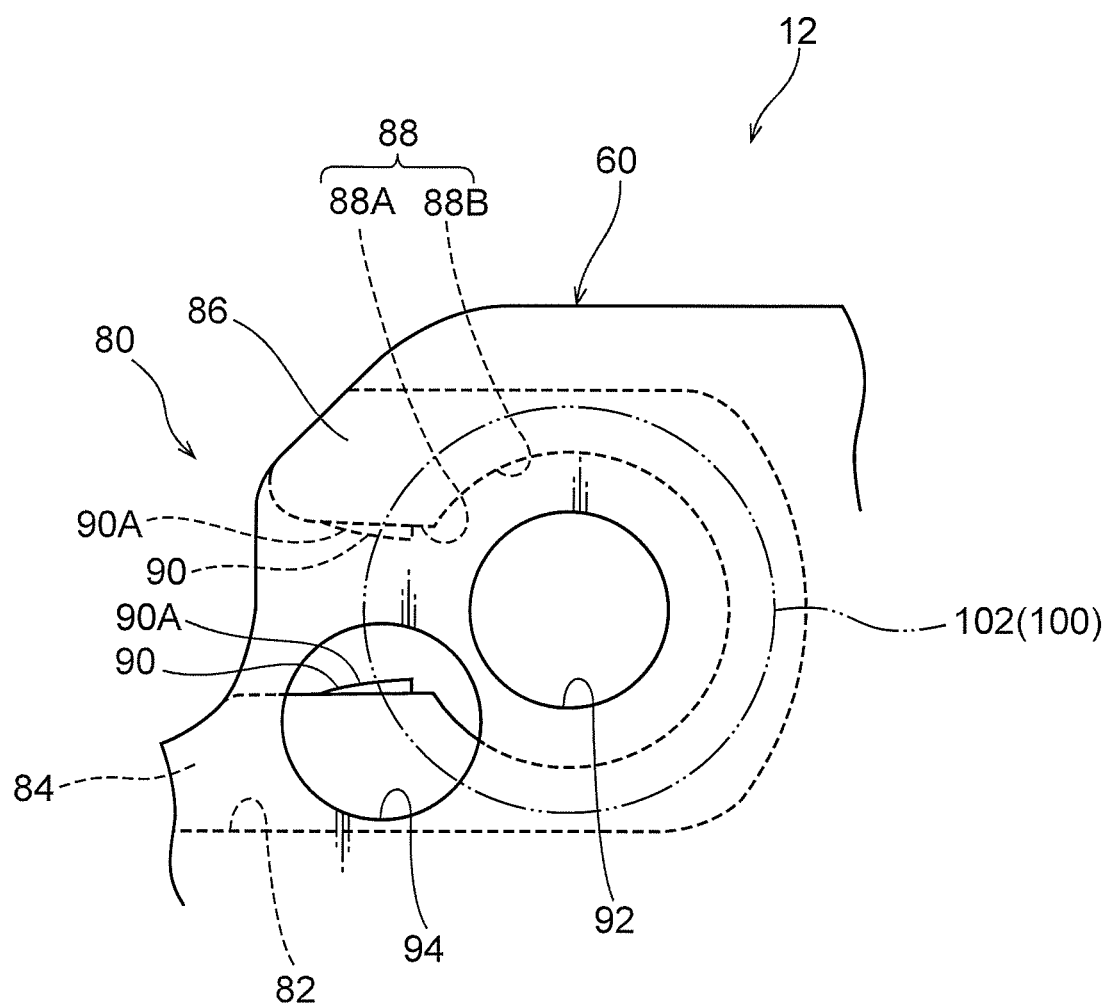
FIG. 1 is a side view (an enlargement of portion F in FIG. 2) showing a portion of a body used in a webbing take-up device configuring a portion of a seatbelt device according to an exemplary embodiment of the present invention, as viewed from a spring cover side.
Figure 3:
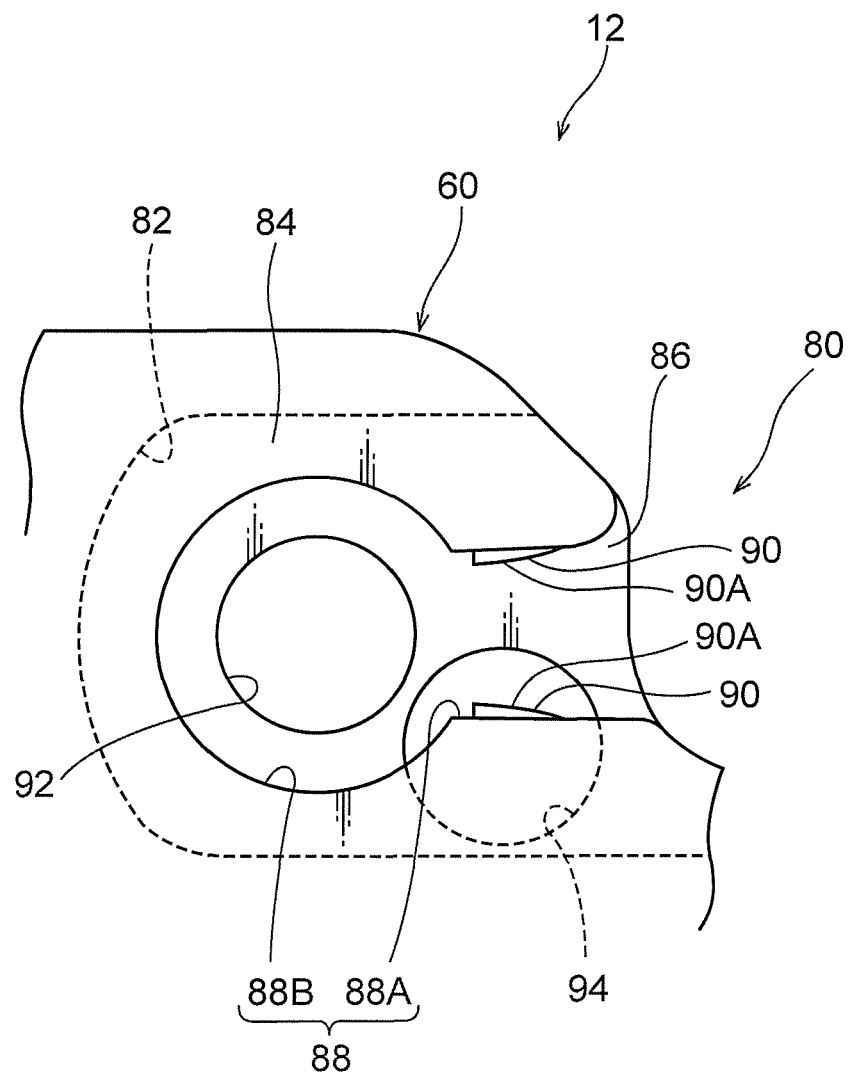
FIG. 3 is a side view showing a portion of the body shown in FIG. 1, as viewed from a frame side.

As shown in FIG. 1 and FIG. 3, a housing portion 82 is formed at an outer peripheral portion of the body 60. The housing portion 82 is configured in a recessed (concave)

shape opening in a direction orthogonal to the body 60 thickness direction (specifically, as shown in FIG. 6, opening toward the back plate 32 plate thickness direction outside (the arrow G direction side in FIG. 6)). The housing portion 82 is moreover formed in a rectangular shape as viewed from the housing portion 82 opening side. A pair of side walls configuring the housing portion 82 are disposed facing each other along the body 60 thickness direction (along the spool 38 axial direction), with the side wall on the frame 30 side of the housing portion 82 configuring one side wall 84, and the side wall on the spring cover 72 side of the housing portion 82 configuring the other side wall 86 (see FIG. 4 and FIG. 5).

The one side wall 84 of the housing portion 82 is formed with an insertion portion 88. The insertion portion 88 penetrates the one side wall 84 in the thickness direction, and is formed in a groove shape open toward the opening side of the housing portion 82 as viewed along the body 60 thickness direction. An opening side portion of the insertion portion 88 configures an insertion path 88A. The insertion path 88A is formed along the length direction of the housing portion 82, with inner peripheral faces of the insertion path 88A disposed parallel to each other as viewed along the body 60 thickness direction. Another end portion of the insertion portion 88, on the opposite side to the insertion path 88A, configures a disposition portion 88B. The disposition portion 88B is formed in a substantially C-shape (a circular shape partially open toward the insertion path 88A side) as viewed along the body 60 thickness direction.

Figure 4:
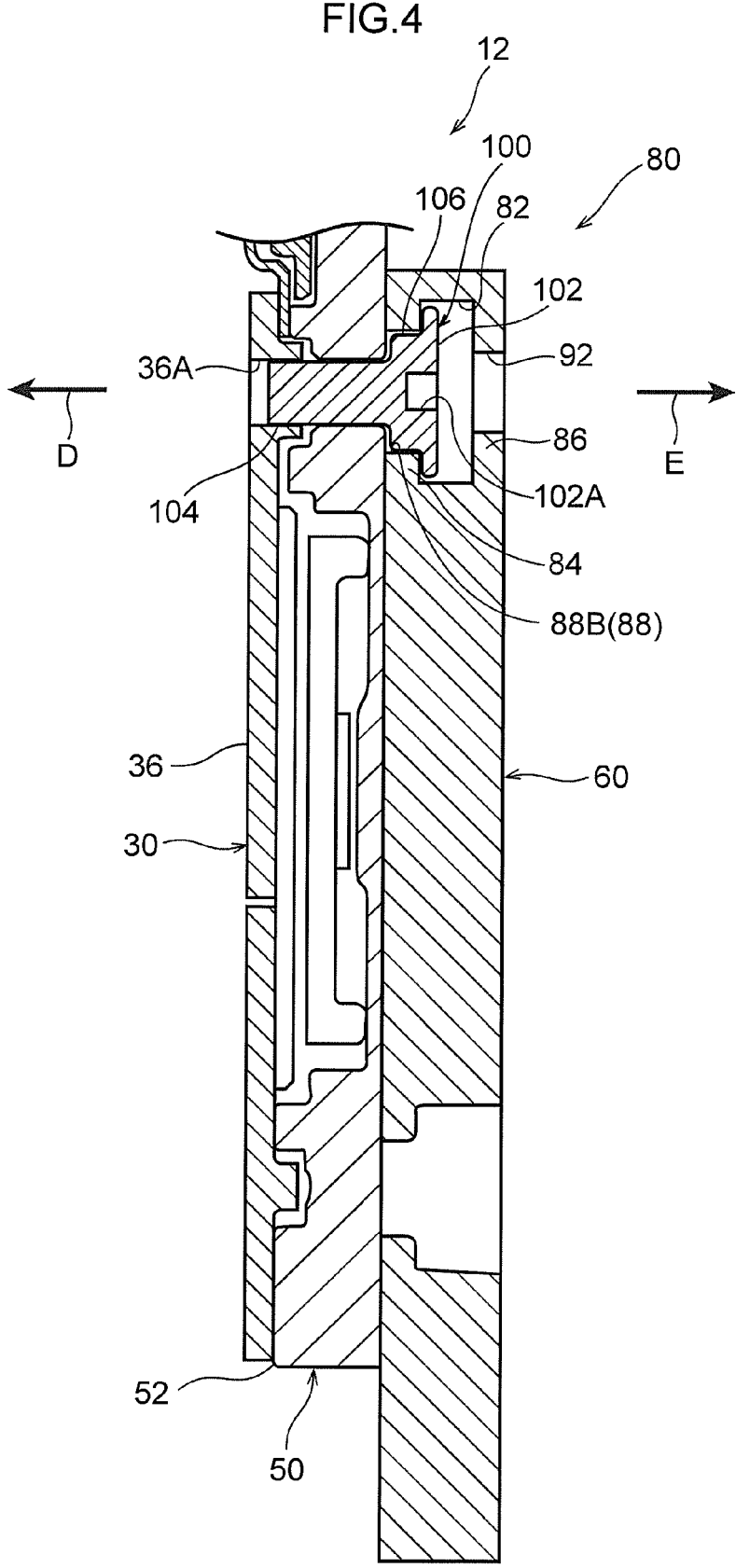
FIG. 4 is a cross-section (a cross-section corresponding to the position of line 4-4 in FIG. 2) showing the body shown in FIG. 2 in a state fixed to the frame.

As shown in FIG. 4, the one side wall 84 of the housing portion 82 is fixed to the leg plate 36 of the frame 30 by a screw 100, serving as a fastening member. The screw 100 is configured by what is referred to as a shoulder screw, and specifically, the screw 100 is configured including a circular plate shaped head portion 102, a thread portion 104, and a circular rod shaped stepped portion 106, disposed between the head portion 102 and the thread portion 104. The external diameter dimension of the stepped portion 106 is set smaller than both the external diameter dimension of the head portion 102, and the internal diameter dimension of the disposition portion 88B of the insertion portion 88, described above. The external diameter dimension of the thread portion 104 is set smaller than the width dimension of the insertion path 88A of the insertion portion 88.

The screw 100 is disposed coaxially to the axial center of the disposition portion 88B (a position referred to as the fastening position). The thread portion 104 of the screw 100 is screwed into a threaded hole 36A formed in the leg plate 36 of the frame 30. In this state, the head portion 102 of the screw 100 is housed inside the housing portion 82, the stepped portion 106 of the screw 100 is disposed inside the disposition portion 88B, and the thread portion 104 of the screw 100 projects out from the body 60 toward the frame 30 side. Moreover, in this state, the case 52 of the switching mechanism 50 is interposed between the body 60 and the frame 30. Note that as shown in FIG. 2, when disposing the screw 100 inside the disposition portion 88B (in the fastening position), the screw 100 is disposed at the side location of the insertion path 88A of the insertion portion 88 and slid toward the disposition portion 88B side (the arrow H direction side in FIG. 2). The thread portion 104 of the screw 100 is inserted into the insertion path 88A of the insertion portion 88, and the head portion 102 and the stepped portion 106 of the screw 100 are inserted into the housing portion 82, to dispose the screw 100 in the disposition portion 88B.

Moreover, as shown in FIG. 1 and FIG. 3, a pair of claw portions 90 is formed to the insertion path 88A of the insertion portion 88. The claw portions 90 are formed in substantially triangular shapes as viewed along the body 60 plate thickness direction, and project out from the inner peripheral faces of the insertion path 88A in mutually approaching directions. Each of the claw portions 90 includes an inclined face 90A, with the respective inclined faces 90A inclined so as to approach each other on progression toward the disposition portion 88B side. The minimum dimension between the pair of claw portions 90 is set smaller than the external diameter dimension of the thread portion 104 of the screw 100.

Accordingly, when sliding the thread portion 104 of the screw 100 toward the disposition portion 88B side of the insertion portion 88, the thread portion 104 presses against (the inclined faces 90A of) the pair of claw portions 90, and the body 60 undergoes resilient deformation so as to widen the insertion path 88A, enabling the screw 100 to slide toward the disposition portion 88B side. Moreover, when the screw 100 attempts to moves from a state disposed inside the disposition portion 88B (the fastening position) toward the housing portion 82 opening side, the thread portion 104 engages with the claw portions 90 to restrict movement of the screw 100 toward the housing portion 82 opening side. Namely, configuration is made such that the screw 100 is temporarily retained inside the disposition portion 88B by the claw portions 90.

A circular shaped tool hole 92 is formed penetrating the other side wall 86 of the housing portion 82. The tool hole 92 is disposed coaxially to the axial center of the disposition portion 88B (namely, to the screw 100), and is in communication with the inside of the housing portion 82. An internal diameter dimension of the tool hole 92 is set so as to enable a leading end portion of a tool for tightening the screw 100 to be inserted into the tool hole 92. Moreover, a fitting recess portion 102A (see FIG. 4), into which the leading end portion of the tool is fitted, is formed at a central portion of the head portion 102 of the screw 100 described above. The fitting recess portion 102A is formed with a substantially star shaped cross-section profile open toward the opposite side of the screw 100 to the thread portion 104. The tool is inserted into the tool hole 92 from the spring cover 72 side, and the tool is used to fasten the screw 100 that is temporarily retained in the disposition portion 88B. The direction toward the frame 30 from the spring cover 72 (the arrow D direction in FIG. 4) is accordingly the screw 100 fastening direction. Note that the cross-section profile of the fitting recess portion 102A of the screw 100 may be also configured with a hexagonal shape or with a cross shape.

A fixing hole 94 for fixing a fixing portion 96 of the spring cover 72, described later, is formed penetrating the other side wall 86 of the housing portion 82 at a position adjacent to the tool hole 92. The fixing hole 94 is formed in a circular shape, and is disposed at a position overlapping the head portion 102 of the screw 100 as viewed along the screw 100 fastening direction (see FIG. 1).

Figure 5:
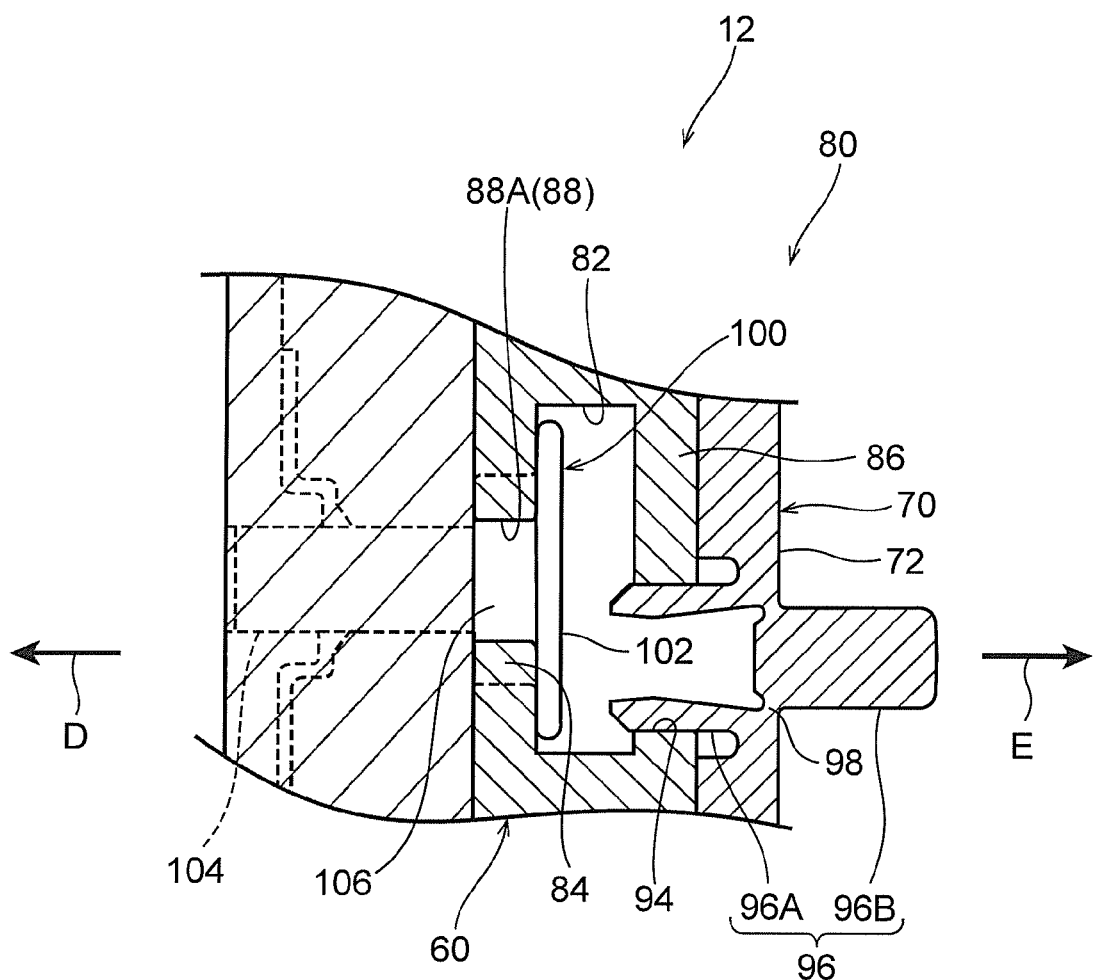
FIG. 5 is an enlarged cross-section (a cross-section corresponding to the position of line 5-5 in FIG. 2) showing the spring cover in a state fixed to the body shown in FIG. 2.

As shown in FIG. 5, the spring cover 72 is integrally formed with the fixing portion 96 at a position corresponding to the fixing hole 94 of the body 60. The fixing portion 96 fixes the spring cover 72 to the body 60. Specifically, the fixing portion 96 is configured including a substantially circular cylinder shaped fitting tube portion 96A and a circular rod shaped boss portion 96B. The fitting tube portion 96A projects out from the spring cover 72 toward the body 60 side, and is disposed coaxially to the fixing hole 94. The external diameter dimension of the fitting tube portion 96A is set slightly smaller than the internal diameter dimension of the fixing hole 94, and the fitting tube portion 96A is inserted into the fixing hole 94. Moreover, the internal diameter dimension of the fitting tube portion 96A is set so as to decrease on progression toward the leading end of the fitting tube portion 96A.

The boss portion 96B of the fixing portion 96 is provided coaxially to the fitting tube portion 96A, and projects out from the spring cover 72 toward the opposite side to the body 60. The external diameter dimension of the boss portion 96B is set larger than the internal diameter dimension at the leading end side of the fitting tube portion 96A. A base end portion of the boss portion 96B is disposed inside a base end portion of the fitting tube portion 96A, and is integrally joined to the fitting tube portion 96A by a breaking portion 98. The breaking portion 98 breaks by the boss portion 96B being pushed in toward the body 60 side (the arrow D direction side in FIG. 5) by a load of a specific load value or greater, such that the boss portion 96B is then inserted into the fitting tube portion 96A. Moreover, when the boss portion 96B has been pushed in as far as the leading end portion of the fitting tube portion 96A, the fitting tube portion 96A is pressed toward the radial direction outside by the boss portion 96B, and an outer peripheral face of the fitting tube portion 96A makes close contact with an inner peripheral face of the fixing hole 94. The fitting tube portion 96A is thereby fixed to the fixing hole 94. Note that the fixing portion 96 and the head portion 102 of the screw 100 are set so as not to interfering with one another in the fixed state of the spring cover 72 to the body 60.

Next, explanation follows regarding operation and advantageous effects of the present exemplary embodiment.

In the webbing take-up device 12 configured as described above, the body 60 is disposed at the outside of the leg plate 36 of the frame 30, with the body 60 fixed to the frame 30 by the screw 100. The spring cover 72 is disposed on the opposite side of the body 60 to the frame 30, and the fixing portion 96 of the spring cover 72 is fixed to the fixing hole 94 of the body 60.

The body 60 is formed with the housing portion 82, the housing portion 82 configured in a recessed shape opening toward a direction orthogonal to the fastening direction of the screw 100. The body 60 is thus formed with the one side wall 84 and the other side wall 86 configuring the housing portion 82, with the other side wall 86, the housing portion 82, and the one side wall 84 disposed in a row along the screw 100 fastening direction.

In a housed state of the head portion 102 of the screw 100 inside the housing portion 82, the screw 100 is inserted through (the disposition portion 88B of) the insertion portion 88 of the one side wall 84 and fastened to the frame 30. As a result, the one side wall 84 of the body 60 is fixed to the frame 30 by the screw 100 with the head portion 102 of the screw 100 in a state disposed inside the body 60.

The other side wall 86 of the body 60 is formed with the tool hole 92. The tool hole 92 is disposed coaxially to the axial center of the disposition portion 88B (the screw 100), and is in communication with the housing portion 82 inside. The screw 100 can accordingly be fastened to the frame 30 by inserting the leading end portion of the tool into the tool hole 92, even with the head portion 102 of the screw 100 housed inside the housing portion 82.

The other side wall 86 of the body 60 is formed with the fixing hole 94 for fixing the fixing portion 96 of the spring cover 72. The fixing hole 94 is disposed at a position overlapping with the head portion 102 of the screw 100 as viewed along the screw 100 fastening direction. Namely, the fixing hole 94 is formed at the other side wall 86, disposed at a different position to the housing portion 82 in the body 60 thickness direction (in the screw 100 fastening direction). The fixing portion 96 of the spring cover 72 is fixed to the fixing hole 94. The fixing hole 94 (fixing portion 96) and the head portion 102 of the screw 100 can accordingly be suppressed from interfering with one another, while the fixing hole 94 can be disposed at a position overlapping with the head portion 102 of the screw 100 as viewed along the screw 100 fastening direction. This thereby enables the placement space of the screw 100 (head portion 102) and the fixing hole 94 in the body 60 to be reduced (smaller), as viewed along the screw 100 fastening direction.

The spring cover 72 is integrally formed with the fixing portion 96, and the fixing portion 96 is configured including the fitting tube portion 96A and the boss portion 96B. The fitting tube portion 96A is inserted inside the fixing hole 94 of the body 60, and the boss portion 96B is pushed inside the fitting tube portion 96A, thereby fixing the fixing portion 96 (fitting tube portion 96A) to the fixing hole 94. The spring cover 72 can accordingly be fixed to the body 60 with a simple configuration while suppressing an increase in cost.

The insertion portion 88 of the body 60 is formed in a groove shape, opening toward the housing portion 82 opening side as viewed along the screw 100 fastening direction. The head portion 102 of the screw 100 can accordingly be inserted into the housing portion 82 while the thread portion 104 of the screw 100 is inserted into the insertion portion 88, thereby enabling the screw 100 to slide (be assembled) toward the disposition portion 88B (fastening position) side of the insertion portion 88.

Moreover, the pair of claw portions 90 are formed to the insertion path 88A of the insertion portion 88. When the screw 100 disposed inside the disposition portion 88B moves toward the housing portion 82 opening side, the thread portion 104 of the screw 100 engages with the claw portions 90. Movement of the screw 100 toward the housing portion 82 opening side is accordingly suppressed. The screw 100 can accordingly be temporarily retained inside the disposition portion 88B. The body 60 can therefore be disposed in an assembly position to the frame 30 with the screw 100 in a temporarily retained state to the body 60, enabling the screw 100 to be fastened to the frame 30 in the assembly position. The assembly characteristic of the body 60 to the frame 30 can accordingly be improved.

The body 60 configuring the webbing take-up device 12 is formed with the housing portion 82, the insertion portion 88, the tool hole 92, and the fixing hole 94. Space saving can accordingly be achieved in the fixing structure of the webbing take-up device 12 in a case in which plural units configured with respective functions are fixed overlapping one another.

Figure 8:
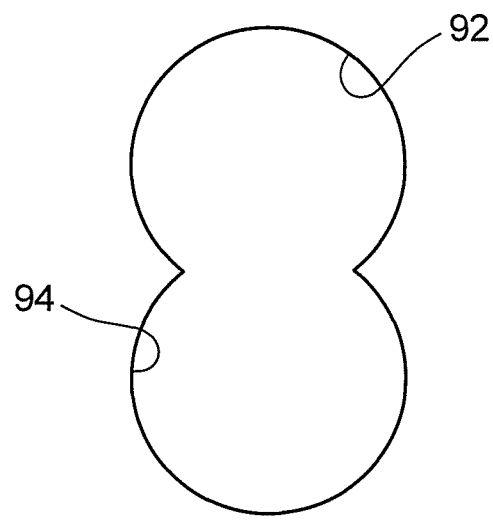
FIG. 8 is a simplified side view showing another exemplary embodiment of the present invention, as viewed from a spring cover side.

In the present exemplary embodiment, the tool hole 92 and the fixing hole 94 are disposed adjacent to one another in the other side wall 86 of the body 60. Alternatively, for example, it is possible that the tool hole 92 and the fixing hole 94 is disposed overlapping with each other as viewed along the screw 100 fastening direction (FIG. 8: configuration is not limited thereto). Namely, the tool hole 92 and the fixing hole 94 can be disposed in communication with each other. This thereby enables the placement space of the screw 100 and the fixing hole 94 in the body 60 to be further reduced as viewed along the screw 100 fastening direction.

Figure 9:
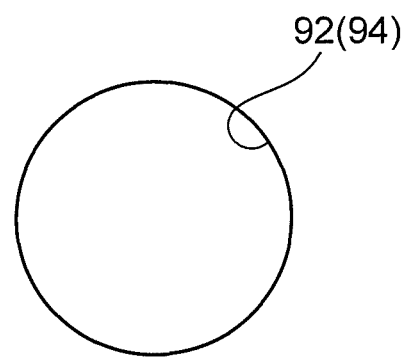
FIG. 9 is a simplified side view showing another exemplary embodiment of the present invention, as viewed from a spring cover side.

Moreover, alternatively, for example, it is possible that the fixing hole 94 formed to the body 60 is omitted, and the fixing portion 96 of the spring cover 72 is configured so as to be fixed inside the tool hole 92. Namely, the tool hole 92 can be commonly used (served) as the fixing hole 94 (FIG. 9: configuration is not limited thereto). Such a configuration enables the tool hole 92 and the fixing hole 94 to be made common to one another, enabling the placement space for the screw 100 and the fixing hole 94 in the body 60 to be further reduced (smaller) as viewed along the screw 100 fastening direction.

Moreover, in the present exemplary embodiment, the housing portion 82, the insertion portion 88, the tool hole 92, and the fixing hole 94 are formed to the body 60, however the member formed with the housing portion 82, the insertion portion 88, the tool hole 92, and the fixing hole 94 is not limited thereto. For example, it is possible that a known drive mechanism (a mechanism to drive rotation of the spool 38 with a motor) is provided, in place of the body 60, with the housing portion 82, the insertion portion 88, the tool hole 92, and the fixing hole 94 formed to a housing of the drive mechanism, in which a motor and gears, for example, are disposed.

In the present exemplary embodiment, the fixing structure 80 is applied to the webbing take-up device 12 configuring the seatbelt device 10. Alternatively, for example, it is possible that the fixing structure 80 is applied to the buckle device 22 configuring the seatbelt device 10. For example, it is possible that the fixing structure 80 is applied in a fixing structure for fixing a functional unit such as a speaker unit to the buckle device 22.

What is claimed is:

1. A seatbelt device comprising:
    a first member that is fixed by a fastening member to a base member used in a device configuration member configuring a portion of the seatbelt device;
    a second member that is fixed to the first member on opposite side of the first member to the base member;
    a housing portion that is formed at the first member, that configures a recessed shape opening in a direction orthogonal to a fastening direction of the fastening member, and that houses a head portion of the fastening member;
    one side wall that configures a side wall of the housing portion on the base member side, and that includes an insertion portion through which the fastening member is inserted; and
    another side wall that configures a side wall of the housing portion on the second member side, that includes a tool hole for inserting a tool to fasten the fastening member to the base member, and that includes a fixing hole for fixing the second member, the fixing hole being disposed at a position overlapping with the head portion of the fastening member as viewed along the fastening direction of the fastening member.

2. The seatbelt device of claim 1, wherein the tool hole and the fixing hole are in communication with each other.

3. The seatbelt device of claim 1, wherein the tool hole is also serves as the fixing hole.

4. The seatbelt device of claim 1, wherein:
    a fixing portion is integrally formed at the second member, and the second member is fixed to the first member by the fixing portion being inserted into the fixing hole and fitting with the fixing hole.

5. The seatbelt device of claim 1, wherein:
    the insertion portion is formed in a groove shape opening toward an opening side of the housing portion as viewed along the fastening direction of the fastening member; and
    a claw portion capable of engaging with the fastening member is formed at an inner peripheral portion of the insertion portion.

6. The seatbelt device of claim 4, wherein:
    the insertion portion is formed in a groove shape opening toward an opening side of the housing portion as viewed along the fastening direction of the fastening member; and
    a claw portion capable of engaging with the fastening member is formed at an inner peripheral portion of the insertion portion.

7. The seatbelt device of claim 1, wherein:
    the device configuration member is a webbing take-up device provided with a webbing that restrains a body of an occupant; and
    the base member is a frame that rotatably supports a spool for taking up the webbing.

8. The seatbelt device of claim 4, wherein:
    the device configuration member is a webbing take-up device provided with a webbing that restrains a body of an occupant; and
    the base member is a frame that rotatably supports a spool for taking up the webbing.

9. The seatbelt device of claim 5, wherein:
    the device configuration member is a webbing take-up device provided with a webbing that restrains a body of an occupant; and
    the base member is a frame that rotatably supports a spool for taking up the webbing.

* * * * *